(12) United States Patent
Shima et al.

(10) Patent No.: US 7,537,712 B2
(45) Date of Patent: May 26, 2009

(54) ELECTRICALLY CONDUCTIVE SILICONE RUBBER COMPOSITION

(75) Inventors: Ryoto Shima, Chiba Prefecture (JP); Kazumi Nakayoshi, Chiba Prefecture (JP); Hiroki Ishikawa, Aichi Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 306 days.

(21) Appl. No.: 10/509,267

(22) PCT Filed: Mar. 3, 2003

(86) PCT No.: PCT/JP03/02444

§ 371 (c)(1), (2), (4) Date: Oct. 27, 2004

(87) PCT Pub. No.: WO03/082983

PCT Pub. Date: Oct. 9, 2003

(65) Prior Publication Data

US 2005/0239940 A1 Oct. 27, 2005

(30) Foreign Application Priority Data

Apr. 3, 2002 (JP) .............................. 2002-101146

(51) Int. Cl.
*H01B 1/02* (2006.01)

(52) U.S. Cl. .................. 252/512; 252/514; 524/440; 524/492; 524/493; 524/501; 524/862; 525/106

(58) Field of Classification Search .................. 528/15, 528/29; 428/36.5, 407; 521/82; 252/511, 252/500, 512, 514; 524/731, 440, 492, 379, 524/501, 588, 755, 862, 493; 257/783; 523/216; 525/106

See application file for complete search history.

(56) References Cited

U.S. PATENT DOCUMENTS

| 4,500,447 | A | * | 2/1985 | Kobayashi et al. ........... 252/511 |
| 4,742,142 | A | | 5/1988 | Shimizu et al. |
| 4,761,454 | A | * | 8/1988 | Oba et al. .................... 524/862 |
| 4,766,176 | A | | 8/1988 | Lee et al. |
| 4,849,564 | A | | 7/1989 | Shimizu et al. |
| 5,015,413 | A | * | 5/1991 | Nagaoka ....................... 252/511 |
| 5,053,167 | A | * | 10/1991 | Kawaguchi .................. 252/511 |
| 5,082,596 | A | * | 1/1992 | Fukuda et al. ............... 252/511 |
| 5,173,765 | A | * | 12/1992 | Nakayoshi et al. ........... 257/783 |
| 5,182,318 | A | * | 1/1993 | Savin .......................... 523/216 |
| 5,229,037 | A | * | 7/1993 | Nakano et al. ............... 252/512 |
| 5,371,139 | A | * | 12/1994 | Yokoyama et al. ........... 524/755 |
| 5,384,075 | A | * | 1/1995 | Okami ........................ 252/511 |
| 5,482,978 | A | * | 1/1996 | Takahashi et al. .............. 521/82 |
| 5,521,245 | A | * | 5/1996 | Hirabayashi et al. ......... 524/493 |
| 5,538,793 | A | * | 7/1996 | Inokuchi et al. .............. 428/407 |
| 5,708,057 | A | * | 1/1998 | Morita et al. ................. 523/402 |
| 5,837,793 | A | * | 11/1998 | Harashima et al. ............. 528/29 |
| 5,840,831 | A | * | 11/1998 | Hamachi et al. ............. 528/488 |
| 5,969,039 | A | | 10/1999 | Kobayashi et al. |
| 6,017,587 | A | | 1/2000 | Kleyer et al. |
| 6,281,279 | B1 | * | 8/2001 | Davis et al. .................. 524/501 |
| 6,299,952 | B1 | * | 10/2001 | Honma et al. ............... 428/36.5 |
| 6,309,563 | B1 | * | 10/2001 | Iino et al. .................... 252/514 |
| 6,339,127 | B1 | * | 1/2002 | Miyatake et al. ............. 525/106 |
| 6,380,301 | B1 | * | 4/2002 | Enami et al. ................. 524/588 |
| 6,414,078 | B1 | * | 7/2002 | Fukushima et al. .......... 524/588 |
| 6,469,090 | B1 | * | 10/2002 | Azechi et al. ................ 524/492 |
| 6,534,581 | B1 | * | 3/2003 | Kleyer et al. ................. 524/379 |
| 6,734,250 | B2 | * | 5/2004 | Azechi et al. ................ 524/588 |
| 6,797,772 | B2 | * | 9/2004 | Nakayoshi et al. ........... 524/731 |
| 2002/0049274 | A1 | * | 4/2002 | Azechi et al. ................ 524/440 |

FOREIGN PATENT DOCUMENTS

| JP | 62-257939 | * | 11/1987 |
| JP | 05-239361 | * | 9/1993 |
| JP | 2001-240679 | | 9/2001 |

* cited by examiner

*Primary Examiner*—Mark Kopec
*Assistant Examiner*—Khanh Tuan Nguyen
(74) *Attorney, Agent, or Firm*—Howard & Howard Attorneys PLLC

(57) ABSTRACT

An electrically conductive silicone rubber composition comprises, at least, (A) 100 parts by weight of an organopolysiloxane having at least two alkenyl groups per molecule, (B) an organopolysiloxane having at least two silicon-bonded hydrogen atoms per molecule (an amount sufficient to cure the present composition), (C) a platinum based catalyst (an amount sufficient to promote the cure of the present composition), (D) 50 parts by weight to 5,000 parts by weight of a metal based electrically conductive filler, and (E) 5 parts by weight to 500 parts by weight of spherical silicone rubber particles with a surface active agent content of not more than 0.3 wt %.

24 Claims, No Drawings

ELECTRICALLY CONDUCTIVE SILICONE RUBBER COMPOSITION

FIELD OF THE INVENTION

This invention relates to an electrically conductive silicone rubber composition containing a metal based electrically conductive filler and spherical silicone rubber particles. More specifically, this invention relates to an electrically conductive silicone rubber composition capable of forming a highly electrically conductive silicone rubber having low hardness and low permanent compression set and exhibiting little thickening due to the addition of the above-mentioned rubber particles.

BACKGROUND

Japanese Unexamined Patent Application Publication No. Hei 3-146557 (U.S. Pat. No. 5,229,037) discloses an electrically conductive silicone rubber composition capable of forming an electrically conductive silicone rubber of low hardness and low permanent compression set. This composition comprises a diorganopolysiloxane, spherical silicone rubber particles with an average particle size of 0.1 micrometers to 50 micrometers, a metal based electrically conductive filler, and a curing agent. The spherical silicone rubber particles are typically prepared by curing a silicone rubber composition in an emulsified state in an aqueous solution of a surface active agent and then drying it in a spray dryer, etc. For this reason, the particles contain the above-mentioned surface active agent on their surface or inside. The problem is that the viscosity of the electrically conductive silicone rubber compositions to which they are added increases. Furthermore, attempting to produce electrically conductive silicone rubber with low permanent compression set by adding a large amount of spherical silicone rubber filler causes a marked increase in the viscosity of the resultant electrically conductive silicone rubber composition, which renders preparation of a homogeneous composition impossible.

Japanese Unexamined Patent Application Publication No. 2000-038510 (U.S. Pat. No. 6,017,587) discloses an electrically conductive silicone rubber composition comprising an organopolysiloxane having at least two alkenyl groups per molecule, an organopolysiloxane having at least two silicon-bonded hydrogen atoms per molecule, a platinum group catalyst, a metal based electrically conductive filler, silicone rubber particles, and an organic solvent. The composition is capable of forming highly electrically conductive silicone rubber when a large amount of the electrically conductive filler is used. Although these silicone rubber particles are finely divided particles of irregular shape, the viscosity of the electrically conductive silicone rubber composition obtained by adding them increases. Furthermore, attempting to produce electrically conductive silicone rubber with low permanent compression set by adding a large amount of a spherical silicone rubber filler results in a marked increase in the viscosity of the obtained electrically conductive silicone rubber composition, which also renders preparation of a homogeneous composition impossible.

OBJECTS OF THE INVENTION

It is an object of this invention to provide an electrically conductive silicone rubber composition containing a metal based electrically conductive filler and spherical silicone rubber particles, capable of forming a highly electrically conductive silicone rubber of low hardness and low permanent compression set and exhibiting little thickening due to the addition of the above-mentioned rubber particles.

SUMMARY OF THE INVENTION

The electrically conductive silicone rubber composition of this invention is characterized by comprising (A) 100 parts by weight of an organopolysiloxane having at least two alkenyl groups per molecule, (B) an organopolysiloxane having at least two silicon-bonded hydrogen atoms per molecule (an amount sufficient to cure the composition), (C) a platinum based catalyst (an amount sufficient to promote the cure of the composition), (D) 50 parts by weight to 5,000 parts by weight of a metal based electrically conductive filler, and (E) 5 parts by weight to 500 parts by weight of spherical silicone rubber particles with a surface active agent content of not more than 0.3 weight %.

DETAILED DESCRIPTION OF THE PREFERRED EMBODIMENTS

Component (A) is an organopolysiloxane having at least two alkenyl groups per molecule. The alkenyl groups are exemplified by vinyl, allyl, butenyl, pentenyl, hexenyl, and heptenyl, with vinyl and hexenyl being preferable. As for the bonding position of the alkenyl group, it is exemplified by the end(s) of the molecular chain, side chains of the molecular chain, or end(s) of the molecular chain and side chains of the molecular chain. In addition, in component (A), silicon-bonded groups other than the alkenyl groups are exemplified by substituted or unsubstituted monovalent hydrocarbon groups, with the exception of alkenyl groups, such as methyl, ethyl, propyl, butyl, pentyl, hexyl, and other alkyl groups; phenyl, tolyl, xylyl, and other aryl groups; benzyl, phenethyl, and other aralkyl groups; 3-chloropropyl, 3,3,3-trifluoropropyl, and other halogenated alkyl groups, with methyl and phenyl being preferable. The molecular structure of component (A) is exemplified by linear, partially branched linear, branched, and network structures, and component (A) may be a mixture of two or more of the above-mentioned organopolysiloxanes of different molecular structures. In addition, the viscosity of component (A) at 25° C. is preferably in the range of 50 milliPascal·seconds (mPa·s) to 500,000 mPa·s, and especially preferably, in the range of 100 mPa·s to 50,000 mPa·s.

Component (A) is exemplified by dimethylsiloxane-methylvinylsiloxane copolymer having both ends of the molecular chain terminated by trimethylsiloxy groups, methylvinylpolysiloxane having both ends of the molecular chain terminated by trimethylsiloxy groups, methylvinylsiloxane-methylphenylsiloxane copolymer having both ends of the molecular chain terminated by trimethylsiloxy groups, dimethylsiloxane-methylvinylsiloxane-methylphenylsiloxane copolymer having both ends of the molecular chain terminated by trimethylsiloxy groups, dimethylpolysiloxane having both ends of the molecular chain terminated by dimethylvinylsiloxy groups, methylvinylpolysiloxane having both ends of the molecular chain terminated by dimethylvinylsiloxy groups, methylphenylpolysiloxane having both ends of the molecular chain terminated by dimethylvinylsiloxy groups, dimethylsiloxane-methylvinylsiloxane copolymer having both ends of the molecular chain terminated by dimethylvinylsiloxy groups, methylvinylsiloxane-methylphenylsiloxane copolymer having both ends of the molecular chain terminated by dimethylvinylsiloxy groups, dimethylpolysiloxane having both ends of the molecular chain terminated by dimethylvinylsiloxy groups, methylvinylsiloxane-methylphenylsiloxane copolymer having both ends of the molecular chain terminated by dimethylvinylsiloxy groups, methylvinylsiloxane-diphenylsiloxane having both ends of the molecular chain terminated by dimethylvinylsiloxy groups, organopolysiloxanes comprising $R_3SiO_{1/2}$ units and $SiO_{4/2}$ units, organopolysiloxanes comprising $RSiO_{3/2}$ units, organopolysiloxanes comprising $R_2SiO_{2/2}$ units and $RSiO_{3/2}$ units, organopolysiloxanes comprising $R_2SiO_{2/2}$ units, $RSiO_{3/2}$, and $SiO_{4/2}$ units, and mixtures of two or more of the above organopolysiloxanes. Radical R stands for a substituted or unsubstituted monovalent hydrocarbon group exemplified by methyl, ethyl, propyl, butyl, pentyl, hexyl, and other alkyl groups; vinyl, allyl, butenyl, pentenyl, hexenyl, heptenyl, and other alkenyl groups; phenyl, tolyl, xylyl, and other aryl groups; benzyl, phenethyl, and other aralkyl groups; 3-chloropropyl, 3,3,3-trifluoropropyl, and other halogenated alkyl groups. It is preferable, however, that at least two R radicals should be alkenyl groups.

Component (B) serves as a cross-linking agent for component (A). Component (B) is an organopolysiloxane having at least two silicon-bonded hydrogen atoms per molecule. The bonding position of the silicon-bonded hydrogen atoms is exemplified by the end(s) of the molecular chain, side chains of the molecular chain, or end(s) of the molecular chain and side chains of the molecular chain. In addition, in component (B), silicon-bonded groups are exemplified by substituted or unsubstituted monovalent hydrocarbon groups, with the exception of alkenyl groups, such as methyl, ethyl, propyl, butyl, pentyl, hexyl, and other alkyl groups; phenyl, tolyl, xylyl, and other aryl groups; benzyl, phenetyl, and other aralkyl groups; 3-chloropropyl, 3,3,3-trifluoropropyl, and other halogenated alkyl groups, with methyl and phenyl being preferable. The molecular structure of component (B) is exemplified by linear, partially branched linear, branched, and network structures, and component (B) may be a mixture of two or more of the above-mentioned organopolysiloxanes of different molecular structures. In addition, the viscosity of component (B) at 25° C. is preferably in the range of from 1 mPa·s to 500,000 mPa·s, and, especially preferably, in the range of from 5 mPa·s to 1,000 mpa·s.

Component (B) is exemplified by methylhydrogenpolysiloxane having both ends of the molecular chain terminated by trimethylsiloxy groups, dimethylsiloxane-methylhydrogensiloxane copolymer having both ends of the molecular chain terminated by trimethylsiloxy groups, methylhydrogensiloxane-methylphenylsiloxane copolymer having both ends of the molecular chain terminated by trimethylsiloxy groups, dimethylsiloxane-methylhydrogensiloxane-methylphenylsiloxane copolymer having both ends of the molecular chain terminated by trimethylsiloxy groups, dimethylpolysiloxane having both ends of the molecular chain terminated by dimethylhydrogensiloxy groups, methylhydrogenpolysiloxane having both ends of the molecular chain terminated by dimethylhydrogensiloxy groups, dimethylsiloxane-methylhydrogensiloxane copolymer having both ends of the molecular chain terminated by dimethylhydrogensiloxy groups, dimethylsiloxane-methylphenylsiloxane copolymer having both ends of the molecular chain terminated by dimethylhydrogensiloxy groups, dimethylsiloxane-methylhydrogensiloxane-methylphenylsiloxane copolymer having both ends of the molecular chain terminated by dimethylhydrogensiloxy groups, organopolysiloxanes comprising $R'_3SiO_{1/2}$ units and $SiO_{4/2}$ units, organopolysiloxanes comprising $R'SiO_{3/2}$ units, organopolysiloxanes comprising $R'_2SiO_{2/2}$ units and $R'SiO_{3/2}$ units, organopolysiloxanes comprising $R'_2SiO2/2$ units, $R'SiO_{3/2}$, and $SiO_{4/2}$ units, and mixtures of two or more of the above organopolysiloxanes. Radical R' stands for a hydrogen atom or a substituted or unsubstituted monovalent hydrocarbon group exemplified by methyl, ethyl, propyl, butyl, pentyl, hexyl, and other alkyl groups; phenyl, tolyl, xylyl, and other aryl groups; benzyl, phenetyl, and other aralkyl groups; 3-chloropropyl, 3,3,3-trifluoropropyl, and other halogenated alkyl groups. It is preferable, however, that at least two R' radicals should be hydrogen atoms.

The content of component (B) is sufficient to cure the present composition, preferably, the content is such that the amount of silicon-bonded hydrogen atoms in the present component per 1 mol of alkenyl groups in component (A) is in the range of from 0.1 mol to 10 mol, and, especially preferably, in the range of from 0.3 mol to 10 mol. This is due to the fact that when the content of component (B) is below the lower end of the range, the resultant composition has a tendency to fail to achieve full cure, and when the content of component (B) exceeds the upper end of the range, the resultant composition may foam in the process of curing, and the heat resistance of the resultant silicone rubber may tend to decrease.

Component (C) is a platinum based catalyst used to promote the crosslinking induced by the hydrosilylation reaction of component (A) and component (B). Component (C) is exemplified by platinum black, platinum supported alumina powders, platinum supported silica powders, platinum supported carbon powders, chloroplatinic acid, alcohol solutions of chloroplatinic acid, platinum olefin complexes, platinum alkenylsiloxane complexes, catalysts in micropowder form obtained by dispersing the above platinum based catalysts in methyl methacrylate resins, polycarbonate resins, polystyrene resins, silicone resins, and other thermoplastic resins. Such catalysts in micropowder form obtained by dispersing platinum based catalysts in thermoplastic resins are disclosed, for instance, in Japanese Unexamined Patent Application Publication No. Sho 64[1989]-045468 (U.S. Pat. No. 4,766,176).

The content of component (C) is sufficient to promote the cure of the present composition. Preferably, the content of component (C) is such that, in weight terms, the amount of platinum metal in component (C) is in the range of from 0.1 ppm to 10,000 ppm relative to the total weight of component (A) and component (B). When the content of component (C) is below the lower end of the range, the resultant composition has a tendency to fail to achieve full cure, and when the content of component (C) exceeds the upper end of the range, cure is not promoted as much as might be expected.

Component (D) is a metal based electrically conductive filler used to impart electrical conductivity to the silicone rubber produced by curing the present composition. Component (D) may comprise an electrically conductive metal powder or a micro-powder plated or coated with metal via vapor deposition. Component (D) is exemplified by micropowders of gold, silver, nickel, copper, and other metals; micropowders obtained by plating or coating the surface of micropowders consisting of ceramics, glass, quartz, organic resin, and the like with gold, silver, nickel, copper, and other metals via vapor deposition; and mixtures of two or more of the above powders. In the present composition, it is preferable to use a silver micropowder as component (D) because this makes it possible to obtain silicone rubbers of excellent electroconductivity upon curing. The shape of the silver micropowder is exemplified by spherical particles, flakes, and dendriform flakes. There are no limitations concerning the average particle size of component (D). Preferably, average particle size of component (D) is in the range of 1 micrometer to 100 micrometers, and especially preferably, in the range of 1 micrometer to 50 micrometers. Component (D) is available in the form of products such as SILCOAT AgC-74SE, SIL-COAT AgC-237 and SILCOAT AgC2190 from Fukuda Metal Foil Powder Co., Ltd., SILBEST TCG-1 from Kabushiki Kaisha Tokuriki Kagaku Kenkyujo, and AY6032 from Tanaka Kikinzoku Kogyo Co., Ltd.

The content of component (D) is in the range of from 50 parts by weight to 5,000 parts by weight, and, preferably, in the range of from 300 parts by weight to 3,000 parts by weight per 100 parts by weight of component (A). When the content of component (D) is below the lower end of the above-mentioned range, the electroconductivity of the silicone rubber obtained by curing the resultant composition tends to be insufficient, and, on the other hand, when it exceeds the upper end of the above-mentioned range, the processability of the resultant composition tends to deteriorate.

Component (E) comprises spherical silicone rubber particles used to form highly electrically conductive silicone rubber of low permanent compression set and exhibiting little thickening due to the addition of the present component. Component (E) may comprise spherical silicone rubber particles obtained by curing a silicone rubber composition emulsified in an aqueous solution of a surface active agent. Component (E) may comprise spherical silicone rubber particles from which excess surface active agent has been removed by washing with water. Component (E) is characterized by containing not more than 0.3 weight % of surface active agent. Although there are no limitations concerning the average particle size of component (E), preferably, it is in the range of from 0.1 micrometers to 500 micrometers, and, especially preferably, in the range of from 0.5 micrometers to 300 micrometers.

Component (E) may be prepared by processes in which a water-base suspension of spherical silicone rubber particles are obtained. For instance, these processes are exemplified by forming a water base suspension by emulsifying a liquid silicone rubber composition in water at a temperature in the range of from 0° C. to 25° C. using a surface active agent and then curing the liquid silicone rubber composition in fine particle form by dispersing the above-mentioned emulsion in water heated to a temperature of at least 25° C. (see Japanese Unexamined Patent Application Publication No. Sho 62[1987]-243621; U.S. Pat. No. 4,742,142), by emulsifying a silicon rubber composition comprising an organopolysiloxane having at least to silicon-bonded hydroxyl groups per molecule, an organopolysiloxane having at least two silicon-bonded hydrogen atoms per molecule, a curing catalyst, and an epoxide compound having at least one unsaturated hydrocarbon radical per molecule in an aqueous solution of a surface active agent and then curing the silicone rubber composition in fine particle form by bringing it into contact with a liquid or gas at a high temperature (see Japanese Unexamined Patent Application Publication No. Sho 64[1989]-056735; U.S. Pat. No. 4,849,564), by emulsifying a silicone rubber composition comprising an organopolysiloxane having at least two alkenyl groups per molecule and an organopolysiloxane having at least two silicon-bonded hydrogen atoms per molecule in an aqueous solution of a surface active agent and then curing the silicone rubber composition in fine particle form by adding a platinum based catalyst (see Japanese Unexamined Patent Application Publication No. Hei 10[1998]-298302; U.S. Pat. No. 5,969,039), or by emulsifying a condensation reaction-crosslinkable silicone rubber composition comprising a crosslinking agent and an organopolysiloxane having at least two silanol groups per molecule in an aqueous solution of a surface active agent and then curing the silicone rubber composition in fine particle form by adding a condensation reaction catalyst emulsified in an aqueous solution of a surface active agent (see Japanese Unexamined Patent Application Publication No. 2001-240679), etc., is dried in a spray dryer etc. to prepare spherical silicone rubber particles and the spherical silicone rubber particles are then subjected to agitation in water or an aqueous solution of an alkali, followed by water removal and then, again, to agitation in water and dehydration by means of centrifugation, etc., and, if necessary, further agitation in an aqueous solution of a lower alcohol, alcohol removal by means of centrifugation etc., and drying in a dryer, or processes, in which the spherical silicone rubber particles are recovered by filtering a water-base suspension of the above-mentioned spherical silicone rubber particles, and these spherical silicone rubber particles are then subjected to agitation in water or an aqueous solution of an alkali, followed by water removal and then, again, to agitation in water and dehydration by means of centrifugation, etc., and, if necessary, further agitation in an aqueous solution of a lower alcohol, alcohol removal by means of centrifugation etc., and drying in a dryer.

The content of component (E) is in the range of 5 parts by weight to 500 parts by weight, and preferably, in the range of 10 parts by weight to 300 parts by weight, per 100 parts by weight of component (A). When the content of component (E) is below the lower end of the range, forming highly electrically conductive silicone rubber of low hardness and low permanent compression set becomes impossible, and when the content of component (E) exceeds the upper end of the range, it is difficult to prepare a homogeneous composition.

To regulate the curing reaction of the present composition, this composition may contain (F) a reaction inhibitor, as an optional component. Component (F) is exemplified by 1-ethynyl-1-cyclohexanol, 2-methyl-3-butyn-2-ol, 2-phenyl-3-butyn-2-ol, 2-ethynylisopropanol, 2-ethynylbutan-2-ol, 3,5-dimethyl-1-hexyn-3-ol, and other acetylenic alcohols; trimethyl(3,5-dimethyl-1-hexyn-3-oxy)silane, methylvinyl-bis(3-methyl-1-butyn-3-oxy)silane, ((1,1-dimethyl-2-propynyl)oxy)trimethylsilane, and other silylated acetylenic alcohols; diallyl maleate, dimethyl maleate, diethyl fumarate, diallyl fumarate, bis(methoxyisopropyl) maleate, and other unsaturated carboxylic esters; 2-isobutyl-1-buten-3-yne, 3,5-dimethyl-3-hexen-1-yne, 3-methyl-3-penten-1-yne, 3-methyl-3-hexen-1-yne, 1-ethynylcyclohexene, 3-ethyl-3-buten-1-yne, 3-phenyl-3-buten-1-yne, and other conjugated eneyne compounds; 1,3,5,7-tetramethyl-1,3,5,7-tetravinylcyclotetrasiloxane, and other vinylcyclotetrasiloxanes. Although there are no limitations concerning the content of component (F), preferably it should be in the range of 0.001 parts by weight to 5 parts by weight per 100 parts by weight of component (A).

To improve processability, the present composition may contain (G) an organic solvent. Component (G) should not impede the hydrosilylation reaction and is exemplified by o-xylene, m-xylene, p-xylene, 1,2,4-trimethylbenzene, 1,3,5-trimethylbenzene, 1,2,4,5-tetramethylbenzene, n-dodecylbenzene, cyclohexylbenzene, and other aromatic hydrocarbon compounds; n-decane, i-decane, n-undecane, n-dodecane, n-tridecane, n-tetradecane, cyclooctane, and other straight-chain or cyclic aliphatic hydrocarbon compounds and paraffinic mixed solvents or isoparaffinic mixed solvents consisting of mixtures of two or more of the above-mentioned compounds; ethyl benzoate, diethyl phthalate, and other ester compounds; dibutyl ether, anisole, phenetole, and other ether compounds, as well as mixtures of two or more of the above organic solvents. When a catalyst in micropowder form obtained by dispersing a platinum based catalyst in methyl methacrylate resin, polycarbonate resin, polystyrene resin, silicone resin, and other thermoplastic resins is used as component (C), component (G) should preferably be an organic solvent that does not dissolve the thermoplastic resins.

Although the content of component (G) is arbitrary, it should preferably be in the range of 0.1 parts by weight to 100 parts by weight, more preferably, in the range of 0.1 parts by weight to 50 parts by weight, and especially preferably, in the range of 0.1 parts by weight to 10 parts by weight, per 100 parts by weight of the total amount of component (A) through component (E). When the content of component (G) is below the lower end of the range, it tends to become impossible to sufficiently improve the processability of the resultant composition, and when it exceeds the upper end of the range, component (D) tends to separate from the resultant composition.

To adjust its processability and regulate the physical properties of the resultant silicone rubber, the present composition may contain fumed silica, wet process silica, carbon black, and other reinforcing fillers; calcined silica, crushed quartz, titanium dioxide, and other non-reinforcing fillers; and, in addition, adhesion promoters, flame retardant agents, heat stabilizers, pigments, and dyes.

EXAMPLES

The term "viscosity" used in the examples refers to values obtained at 25° C. The viscosity of electrically conductive silicone rubber compositions at 25° C. was measured using an E-type rotary viscometer (the DVU-EII Model from Tokimec Inc.). The hardness, permanent compression set, and electrical resistivity of the electrically conductive silicone rubbers were measured as follows.

An electrically conductive silicone rubber composition was subjected to compression molding for 5 minutes at 90° C. and then heat treated for two hours at 150° C. to fabricate a sheet-like sample of electrically conductive silicone rubber with a thickness of 1 millimeter (mm) and a cylinder-shaped sample of electrically conductive silicone rubber with a diameter of 28 mm and a thickness of 12 mm. The hardness of the electrically conductive silicone rubber was measured using a Type A durometer, as specified in JIS K 6253. In addition, the permanent compression set of the electrically conductive silicone rubber was measured in accordance with the permanent compression set test specified in JIS K 6262 (specimen compression percentage: 25%; test temperature: 150° C.; test time: 22 hours). The electrical resistivity of the electrically conductive silicone rubber was measured in accordance with the "four point probe array" technique specified in JIS K 7194.

REFERENCE EXAMPLE 1

A homogeneous water base emulsion of a silicone rubber composition was prepared by homogeneously mixing, at a temperature of 5° C., 100 parts by weight of a hydrosilylation reaction-curable silicone rubber composition with a viscosity of 400 mPa·s at 25° C. (which, on curing, forms silicone rubber with a Type A durometer hardness of 37 as defined in JIS K 6253), quickly combining it with 200 parts by weight of purified water with a temperature of 25° C. (electrical conductivity=0.2 μS/cm) and 4 parts by weight of polyoxyethylene nonyl phenyl ether (HLB=13.1), and then passing the mixture through a Homogenizer (300 kgf/cm$^2$).

Next, the water base emulsion of a silicone rubber composition was used to prepare an aqueous dispersion of silicone rubber powder by letting it stand for 6 hours at 30° C. Spherical silicone rubber particles with a number-average particle size of 4 micrometers were prepared by heating the aqueous dispersion of silicone rubber powder for 1 hour at 80° C. and then spray-drying it in a stream of air heated to 300° C. at a flow rate of 3 liters/hour.

After subjecting 10 grams (g) of the spherical silicone rubber particles and 100 g of an isopropyl alcohol to agitation in a "Homodisper" dispersing machine for 10 minutes at 1000 revolutions per minute (rpm) and then for another 10 minutes at 500 rpm, the dispersion was allowed to stand for 12 hours at room temperature. After that, the dispersion was filtered through a paper filter and the filtrate removed. After eluting isopropyl alcohol from the filtrate using an evaporator at 80° C. and 70 mmHg, the amount of surface active agent in the resultant residue was obtained by proton nuclear magnetic resonance spectral analysis. As a result, it was confirmed that the content of the surface active agent (polyoxyethylene nonyl phenyl ether) in the spherical silicone rubber particles was 0.5 wt %.

REFERENCE EXAMPLE 2

After subjecting 10 parts by weight of the spherical silicone rubber particles prepared in Reference Example 1 along with a mixture of 0.2 parts by weight of 1 weight % sodium hydroxide aqueous solution and 100 parts by weight of purified water (electrical conductivity=0.2 μS/cm) to agitation at 3000 rpm at room temperature for 1 hour in a "Homodisper" dispersing machine, the dispersion was let stand for 1.5 hours. After that, the spherical silicone rubber particles were filtered off using a paper filter. After subjecting the slurry consisting of the filtered spherical silicone rubber particles to agitation for another hour in 100 parts by weight of purified water (electrical conductivity=0.2 μS/cm), the slurry was allowed to stand for 1.5 hours. After that, the spherical silicone rubber particles were filtered off and washed with purified water. This operation was repeated twice, preparing a slurry of spherical silicone rubber particles, which was dried in an oven at 100° C. Measurements confirmed that the contents of the surface active agent (polyoxyethylene nonyl phenyl ether) in the spherical silicone rubber particles was 0.1 wt %.

APPLICATION EXAMPLE 1

An electrically conductive silicone rubber composition was prepared by homogeneously mixing: as component (A), 100 parts by weight of a dimethylpolysiloxane with a viscosity of 40,000 mPa·s having both ends of the molecular chain terminated by dimethylvinylsiloxy groups (vinyl group content=0.1 wt %); as component (B), 0.8 parts by weight of an organopolysiloxane represented by the average unit formula: [(CH$_3$)$_2$HSiO$_{1/2}$]$_{1.6}$(SiO$_{4/2}$)$_{1.0}$ (content of silicon-bonded hydrogen atoms=1.0 wt %) {which provides 2 mol of silicon-bonded hydrogen atoms from this component per 1 mol of vinyl groups in component (A)}; as component (C), 14 parts by weight of a platinum based catalyst in microparticulate form with an average particle size of 2 micrometers obtained by dispersing platinum-1,3-divinyltetramethyldisiloxane complex in a thermoplastic silicone resin with a softening point of 80 to 90° C. {which provides, in weight terms, 230 ppm of platinum metal from the catalyst relative to the total weight of the above-mentioned component (A) and the above-mentioned component (B)}; as component (D), 600 parts by weight of flake-shaped silver micropowder with an average particle size of 7 micrometers and a specific surface area of 0.7 m$^2$/g (available from Fukuda Metal Foil Powder Co., Ltd., trade name: SILCOAT AgC2190); as component (E), 100 parts by weight of the spherical silicone rubber particles prepared in Reference Example 2; and, as component (F), 0.07 parts by weight of methylvinylbis(3-methyl-1-butyn-3-oxy)silane.

COMPARATIVE EXAMPLE 1

An electrically conductive silicone rubber composition was prepared in the same manner as in Application Example 1, except that in Application Example 1, the spherical silicone rubber particles prepared in Reference Example 1 were added instead of the spherical silicone rubber particles prepared in Reference Example 2, with the amount added remaining the same. Due to a marked increase in viscosity, however, a homogeneous composition could not be prepared.

TABLE 1

| Parameters | Example Type | |
| --- | --- | --- |
| | Application Example 1 | Comparative Example 1 |
| Viscosity (Pa · s) | 1000 | — |
| Hardness | 59 | — |
| Permanent compression set (%) | 55 | — |
| Electrical resistivity (Ω · cm) | $3 \times 10^{-4}$ | — |

From the results listed in Table 1, it can be seen that, in comparison with the spherical silicone rubber particles with a surfactant content of 0.5 wt %, the spherical silicone rubber particles with a surfactant content of 0.1 wt % did not increase the viscosity of the electrically conductive silicone rubber composition when mixed therewith in the same amount, thereby permitting preparation of a homogeneous composition.

APPLICATION EXAMPLE 2

An electrically conductive silicone rubber composition was prepared by homogeneously mixing: as component (A), 100 parts by weight of a dimethylpolysiloxane with a viscosity of 40,000 mPa·s having both ends of the molecular chain terminated by dimethylvinylsiloxy groups (vinyl group content=0.1 wt %); as component (B), 0.8 parts by weight of an organopolysiloxane represented by the average unit formula: $[(CH_3)_2HSiO_{1/2}]_{1.6}(SiO_{4/2})_{1.0}$ (content of silicon-bonded hydrogen atoms=1.0 wt %) {which provides 2 mol of silicon-bonded hydrogen atoms from this component per 1 mol of vinyl groups in component (A)}; as component (C), 14 parts by weight of a platinum based catalyst in microparticulate form with an average particle size of 2 micrometer obtained by dispersing platinum-1,3-divinyltetramethyldisiloxane complex in a thermoplastic silicone resin with a softening point of 80 to 90° C. {which provides, in weight terms, 230 ppm of platinum metal from the catalyst relative to the total weight of the above-mentioned component (A) and the above-mentioned component (B)}; as component (D), 600 parts by weight of flake-shaped silver micropowder with an average particle size of 7 micrometers and a specific surface area of 0.7 m²/g (available from Fukuda Metal Foil Powder Co., Ltd., trade name: SILCOAT AgC2190); as component (E), 50 parts by weight of the spherical silicone rubber particles prepared in Reference Example 2; as component (F), 0.07 parts by weight of methylvinylbis(3-methyl-1-butyn-3-oxy)silane; and, as component (G), 36 parts by weight of an isoparaffinic solvent (available from Nippon Petrochemicals Co., Ltd., trade name: Isosol 400K).

APPLICATION EXAMPLE 3

An electrically conductive silicone rubber composition was prepared in the same manner as in Application Example 2, except that in Application Example 2, the amount of the spherical silicone rubber particles prepared in Reference Example 2 was changed to 100 parts by weight.

APPLICATION EXAMPLE 4

An electrically conductive silicone rubber composition was prepared in the same manner as in Application Example 2, except that in Application Example 2, the amount of the spherical silicone rubber particles prepared in Reference Example 2 was changed to 150 parts by weight.

COMPARATIVE EXAMPLE 2

An electrically conductive silicone rubber composition was prepared in the same manner as in Application Example 2, except that in Application Example 2, the spherical silicone rubber particles prepared in Reference Example 1 were added instead of the spherical silicone rubber particles prepared in Reference Example 2, with the amount added remaining the same.

COMPARATIVE EXAMPLE 3

An electrically conductive silicone rubber composition was prepared in the same manner as in Application Example 3, except that in Application Example 3, the spherical silicone rubber particles prepared in Reference Example 1 were added instead of the spherical silicone rubber particles prepared in Reference Example 2, with the amount added remaining the same. Due to a marked increase in viscosity, however, a homogeneous composition could not be prepared.

COMPARATIVE EXAMPLE 4

An electrically conductive silicone rubber composition was prepared in the same manner as in Application Example 4, except that in Application Example 4, the spherical silicone rubber particles prepared in Reference Example 1 were added instead of the spherical silicone rubber particles prepared in Reference Example 2, with the amount added remaining the same. Due to a marked increase in viscosity, however, a homogeneous composition could not be prepared.

TABLE 2

| Parameters | Example Type | | | | | |
| --- | --- | --- | --- | --- | --- | --- |
| | Application Examples | | | Comparative Examples | | |
| | 2 | 3 | 4 | 2 | 3 | 4 |
| Viscosity (Pa · s) | 300 | 700 | 1000 | 600 | — | — |
| Hardness | 58 | 59 | 60 | 58 | — | — |

TABLE 2-continued

| | Example Type | | | | | |
| --- | --- | --- | --- | --- | --- | --- |
| | Application Examples | | | Comparative Examples | | |
| Parameters | 2 | 3 | 4 | 2 | 3 | 4 |
| Permanent compression set (%) | 70 | 55 | 40 | 70 | — | — |
| Electrical resistivity (Ω · cm) | $3 \times 10^{-4}$ | $3 \times 10^{-4}$ | $3 \times 10^{-4}$ | $3 \times 10^{-4}$ | — | — |

From the results listed in Table 2, it can be seen that an electrically conductive silicone rubber composition with good processability could be formed even when using a large amount of spherical silicone rubber particles with a surfactant content of 0.1 wt % as a filler. On the other hand, it was found that when a large amount of spherical silicone rubber particles with a surfactant content of 0.5 wt % were used as a filler, the viscosity of the composition markedly increased, making it difficult to prepare a homogeneous electrically conductive silicone rubber composition. In addition, from the results listed in Table 2, it was determined that while the electrical resistivity and hardness of the electrically conductive silicone rubber did not depend on the content of the spherical silicone rubber particles and remained fairly constant, its permanent compression set decreased as the amount of the added spherical silicone rubber particles increased. In particular, it was determined that in Application Example 3 (where the electrically conductive silicone rubber composition contained 150 parts by weight of the spherical silicone rubber particles per 100 parts by weight of a dimethylpolysiloxane having both ends of the molecular chain terminated by dimethylvinylsiloxy groups), the resultant electrically conductive silicone rubber, while exhibiting high electrical conductivity, had a smaller permanent compression set than that achieved in prior art.

INDUSTRIAL APPLICABILITY

The electrically conductive silicone rubber composition of the present invention is characterized by containing a metal based electrically conductive filler and spherical silicone rubber particles and by being capable of forming a highly electrically conductive silicone rubber having a low permanent compression set and exhibiting little thickening due to the addition of the said rubber particles.

Because this composition is an electrically conductive silicone rubber composition possessing excellent processability, even though it contains a large amount of spherical silicone rubber particles as a filler in order to form highly electrically conductive silicone rubber of low hardness and low permanent compression set, it is suitable as a raw material for forming electrically conductive silicone rubber requiring low stress and high electrical conductivity (low electrical resistivity) as well as for electrically conductive adhesives, heat-radiating adhesives, and electromagnetic wave shielding agents. Due to its superior handling properties, this composition may be suitable for pressure forming, transfer molding, injection molding, calender molding, and other molding techniques. Because the silicone rubber obtained from the composition is highly electrically conductive, highly thermoconductive, and has low hardness and permanent compression set, it is suitable for making flexible connectors, anisotropic electrically conductive films, and various other electrode materials, as well as for sheet- and pad-shaped heat-radiating materials.

The invention claimed is:

1. An electrically conductive silicone rubber composition comprising:
    (A) 100 parts by weight of an organopolysiloxane having at least two alkenyl groups per molecule;
    (B) an organopolysiloxane having at least two silicon-bonded hydrogen atoms per molecule wherein component (B) is present in an amount which provides from 0.1 mol to 10 mol of silicon-bonded hydrogen atoms from component (B) per 1 mol of alkenyl groups of component (A) and which is sufficient to cure the composition;
    (C) an amount sufficient to promote cure of the composition, of a platinum based catalyst;
    (D) 300 to 5,000 parts by weight of a metal based electrically conductive filler; and
    (E) 5 to 500 parts by weight of spherical silicone rubber particles containing a surface active agent, with said surface active agent present in component (E) but contains not more than 0.3 wt %.

2. The composition of claim 1, where the content of component (C) provides, in weight terms, from 0.1 ppm to 10,000 ppm of platinum metal from component (C) relative to total weight of component (A) and component (B).

3. The composition of claim 1, where component (D) comprises an electrically conductive metal powder or a micropowder plated or coated with metal via vapor deposition.

4. The composition of claim 1, where component (E) comprises spherical silicone rubber particles obtained by curing a silicone rubber composition emulsified in an aqueous solution of a surface active agent.

5. The composition of claim 1, where component (E) comprises spherical silicone rubber particles from which excess surface active agent has been removed by washing with water.

6. The composition of claim 1, further comprising (F) 0.001 parts by weight to 5 parts by weight, per 100 parts by weight of component (A), of a reaction inhibitor.

7. The composition of claim 1, further comprising (G) 0.1 parts by weight to 100 parts by weight, relative to the total amount of component (A) to component (E) as 100 parts by weight, of an organic solvent.

8. The composition of claim 1 for use in pressure forming, transfer molding, injection molding, or calender molding.

9. A product prepared by curing the composition of claim 1.

10. The product of claim 9 for use as an electrically conductive adhesive, heat-radiating adhesive, or electromagnetic wave shielding agent.

11. The product of claim 9 for use in making flexible connectors, anisotropic electrically conductive films, and various other electrode materials, or for heat-radiating materials.

12. The composition of claim 2 for use in pressure forming, transfer molding, injection molding, or calender molding.

13. The composition of claim 3 for use in forming, transfer molding, injection molding, or calender molding.

14. The composition of claim 4 for use in pressure forming, transfer molding, injection molding, or calender molding.

15. The composition of claim 5 for use in pressure forming, transfer molding, injection molding, or calender molding.

16. The composition of claim 6 for use in pressure forming, transfer molding, injection molding, or calender molding.

17. The composition of claim 7 for use in pressure forming, transfer molding, injection molding, or calender molding.

18. A product prepared by curing the composition of claim 1.

19. A product prepared by curing the composition of claim 2.

20. A product prepared by curing the composition of claim 3.

21. A product prepared by curing the composition of claim 4.

22. A product prepared by curing the composition of claim 5.

23. A product prepared by curing the composition of claim 6.

24. A product prepared by curing the composition of claim 7.

* * * * *

UNITED STATES PATENT AND TRADEMARK OFFICE
CERTIFICATE OF CORRECTION

PATENT NO. : 7,537,712 B2  Page 1 of 1
APPLICATION NO. : 10/509267
DATED : May 26, 2009
INVENTOR(S) : Ryoto Shima et al.

It is certified that error appears in the above-identified patent and that said Letters Patent is hereby corrected as shown below:

Column 13, line 7, after "in," insert therein -- pressure --.

Signed and Sealed this

Eighth Day of September, 2009

David J. Kappos
*Director of the United States Patent and Trademark Office*